United States Patent
Liu

(10) Patent No.: US 12,220,635 B2
(45) Date of Patent: Feb. 11, 2025

(54) VIRTUAL UNMANNED AERIAL VEHICLE CONTROL METHOD AND APPARATUS, STORAGE MEDIUM, AND ELECTRONIC DEVICE

(71) Applicant: TENCENT TECHNOLOGY (SHENZHEN) COMPANY LIMITED, Shenzhen (CN)

(72) Inventor: Zhihong Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 79 days.

(21) Appl. No.: 17/171,950

(22) Filed: Feb. 9, 2021

(65) Prior Publication Data
US 2021/0187390 A1 Jun. 24, 2021

Related U.S. Application Data

(63) Continuation of application No. PCT/CN2020/121394, filed on Oct. 16, 2020.

(30) Foreign Application Priority Data

Dec. 19, 2019 (CN) .......................... 201911319494.9

(51) Int. Cl.
*A63F 13/537* (2014.01)
*G06F 3/04815* (2022.01)
(Continued)

(52) U.S. Cl.
CPC ........ *A63F 13/537* (2014.09); *G06F 3/04815* (2013.01); *G06F 3/04842* (2013.01); *G06F 3/0488* (2013.01)

(58) Field of Classification Search
CPC .... A63F 13/537; A63F 13/5252; A63F 13/69; A63F 13/837; G06F 3/04815; G06F 3/04842; G06F 3/0488
See application file for complete search history.

(56) References Cited

U.S. PATENT DOCUMENTS 9,067,132 B1 * 6/2015 Bergeron ................. G06F 3/016
9,530,318 B1 * 12/2016 Turner ................. G08G 5/0034
(Continued)

FOREIGN PATENT DOCUMENTS

| CN | 104111861 A | 10/2014 |
| CN | 205384512 U | 7/2016 |

(Continued)

OTHER PUBLICATIONS

The State Intellectual Property Office of the People's Republic of China (SIPO) Office Action 1 for 201911319494.9 Oct. 15, 2020 20 Pages (including translation).
(Continued)

*Primary Examiner* — Haoshian Shih
(74) *Attorney, Agent, or Firm* — ANOVA LAW GROUP, PLLC

(57) ABSTRACT

This application discloses a virtual unmanned aerial vehicle (UAV) control method and apparatus, a storage medium, and an electronic device. The UAV control method includes: displaying, in a currently running one-round interactive task in a target interactive application, an interactive picture within a field of view of a first virtual operation object; calling, in response to a virtual UAV of the first virtual operation object being in a target state, the virtual UAV in the target interactive application in response to a first target operation; and displaying, in the target interactive application, an interactive picture within a field of view of the virtual UAV.

18 Claims, 7 Drawing Sheets

(51) Int. Cl.
*G06F 3/04842* (2022.01)
*G06F 3/0488* (2022.01)

(56) References Cited

U.S. PATENT DOCUMENTS

| | | | |
|---|---|---|---|
| 2004/0130525 | A1 | 7/2004 | Suchocki |
| 2009/0181736 | A1* | 7/2009 | Haigh-Hutchinson ...................... A63F 13/55 463/2 |
| 2011/0173587 | A1* | 7/2011 | Detwiller ................. A63F 13/92 717/109 |
| 2011/0221692 | A1* | 9/2011 | Seydoux ............. G06F 3/04883 345/173 |
| 2014/0100008 | A1* | 4/2014 | Sitnikau ................... G09B 9/02 463/6 |
| 2014/0315644 | A1* | 10/2014 | Itakura .................... A63F 13/69 463/42 |
| 2015/0273334 | A1* | 10/2015 | Nishimura ............ A63F 13/211 463/31 |
| 2016/0327956 | A1* | 11/2016 | Zhang .................... B64D 47/08 |
| 2019/0011921 | A1* | 1/2019 | Wang .................. G05D 1/0011 |
| 2019/0094981 | A1* | 3/2019 | Bradski ................ H04N 21/414 |
| 2019/0121352 | A1* | 4/2019 | Lee ...................... G05D 1/0016 |
| 2019/0220002 | A1* | 7/2019 | Huang ................... G06F 1/163 |
| 2019/0253611 | A1* | 8/2019 | Wang ................. G06F 3/04845 |

FOREIGN PATENT DOCUMENTS

| | | |
|---|---|---|
| CN | 108066981 A | 5/2018 |
| CN | 110465087 A | 11/2019 |
| CN | 111111218 A | 5/2020 |

OTHER PUBLICATIONS

Dongfengxue, Retrieved from the Internet:URL: https://www.bilibili.com/video/BV15J411k7Hb?from=search&seid=17947219970402020247, Dec. 15, 2019 (Dec. 15, 2019), Start to end of the video. 4 pages.

Game Down, Retrieved from the Internet: URL: https://baijiahao.baidu.com/s?id=1623535309363205944&wfr=spider&for=pc, Jan. 24, 2019 (Jan. 24, 2019), pp. 1-3. 3 pages.

Promise Game Commentary, Retrieved from the Internet: URL: https://www.bilibili.com/video/BV1gJ411t7dy?from=search&seid=17947219970402020247, Dec. 18, 2019 (Dec. 18, 2019), Start to end of the video. 1 page.

Blue One Game, Retrieved from the Internet:URL: https://www.bilibili.com/video/BV1oJ411i7DS?from=search&seid=17947219970402020247, Dec. 7, 2019 (Dec. 7, 2019), Start to end of the video. 1 page.

The World Intellectual Property Organization (WIPO) International Search Report for PCT/CN2020/121394 Jan. 18, 2021 6 Pages (including translation).

Non-official translation) Rogue Nine Songs, "(Non-official translation)Introducing Peace Elite Extreme Cold Mode with Drones, Snowboard, Snow Beasts and Other Game Modes," Weibo.com, Retrieved from the Internet: URL: https://weibo.com/u/5711086765?is_all=1&stat_date=201912#feedtop. Dec. 9, 2019 (Dec. 9, 2019), 2:00-4:10 period. 1 page.

Hao Xinag, "Xianghao Solving Mystery 686: The new gameplay of the old mode in the extreme cold mode adds a drone kerosene stove," Weibo.com, Retrieved from the Internet: URL: https://weibo.com/u/6155290488?is_all=1&stat_date=201912&page=2#feedtop, Dec. 7, 2019 (Dec. 7, 2019), 0:30-2:40 period. 1 page.

(Non-official translation) Dongfengxue From Zhonghuajia Team, "(Non-official translation) Zhonghuajia Team's Dream: Know Everything about Drone on Extreme Cold Mode in Peacekeeper Elite," Bilibili.com, Retrieved from the Internet: URL: https://www.bilibili.com/video/BV15J411k7Hb?from=search&seid=17947219970402020247, Dec. 15, 2019 (Dec. 15, 2019), 0:20-4:40 period. 1 page.

\* cited by examiner

VIRTUAL UNMANNED AERIAL VEHICLE CONTROL METHOD AND APPARATUS, STORAGE MEDIUM, AND ELECTRONIC DEVICE

RELATED APPLICATIONS

This application claims priority to PCT Application No. PCT/CN2020/121394 filed on Oct. 16, 2020, which in turn claims priority to Chinese Patent Application No. 2019113194949, entitled "VIRTUAL UNMANNED AERIAL VEHICLE CONTROL METHOD AND APPARATUS, STORAGE MEDIUM, AND ELECTRONIC DEVICE" and filed with the National Intellectual Property Administration, PRC on Dec. 19, 2019. Both applications are incorporated herein by reference in its entirety.

FIELD OF THE TECHNOLOGY

This application relates to the field of computers, and in particular, to a virtual unmanned aerial vehicle (UAV) control method and apparatus, a storage medium, and an electronic device.

BACKGROUND OF THE DISCLOSURE

Reconnaissance is a very important combat mode in current shooting interactions. In most current interactions, all existing reconnaissance methods are to scan a mini-map and then display an enemy track on the mini-map, such as position information and the quantity of opponents. Such reconnaissance methods are relatively simple, a field of view presented is singular and limited, and an enemy is easy to be omitted. As a result, users cannot fully understand a situation of the enemy in real time, and there is a drawback that the situation of the enemy cannot be truly reflected, leading to a poor interactive experience for the users.

Therefore, in the related art, there is a problem of a single field of view when searching for an enemy track in virtual shooting interactions.

SUMMARY

Embodiments of this application provide a virtual UAV control method and apparatus, a storage medium, and an electronic device.

One aspect of the present disclosure provides a virtual UAV control method performed by an electronic device. The UAV control method includes: displaying, in a currently running one-round interactive task in a target interactive application, an interactive picture within a field of view of a first virtual operation object; calling, in response to a virtual UAV of the first virtual operation object being in a target state, the virtual UAV in the target interactive application in response to a first target operation; and displaying, in the target interactive application, an interactive picture within a field of view of the virtual UAV.

Another aspect of the present disclosure provides a virtual UAV control apparatus. The apparatus includes a first display unit, configured to display, in a currently running one-round interactive task in a target interactive application, an interactive picture within a field of view of a first virtual operation object; a first response unit, configured to call, in response to a virtual UAV of the first virtual operation object is in a target state, the virtual UAV in the target interactive application in response to a first target operation; and a second display unit, configured to display, in the target interactive application, an interactive picture within a field of view of the virtual UAV.

Another aspect of the present disclosure provides a virtual UAV control apparatus. The apparatus includes a memory, configured to store an executable instruction; and a processor, configured to execute the executable instruction to: display, in a currently running one-round interactive task in a target interactive application, an interactive picture within a field of view of a first virtual operation object; call, in response to a virtual UAV of the first virtual operation object is in a target state, the virtual UAV in the target interactive application in response to a first target operation; display, in the target interactive application, an interactive picture within a field of view of the virtual UAV.

Another aspect of the present disclosure provides a non-transitory computer-readable storage medium. The computer-readable storage medium storing a computer program, the computer program, when executed by one or more processors, implementing a UAV control method. The method includes displaying, in a currently running one-round interactive task in a target interactive application, an interactive picture within a field of view of a first virtual operation object; calling, in response to a virtual UAV of the first virtual operation object being in a target state, the virtual UAV in the target interactive application in response to a first target operation; and displaying, in the target interactive application, an interactive picture within a field of view of the virtual UAV.

Details of one or more embodiments of this application are provided in the following drawings and descriptions.

BRIEF DESCRIPTION OF THE DRAWINGS

The accompanying drawings described herein are used for providing further understanding of this application, and form a part of this application. Exemplary embodiments of this application and descriptions thereof are used for explaining this application, and do not constitute any inappropriate limitation to this application. In the accompanying drawings.

DESCRIPTION OF EMBODIMENTS

To make a person skilled in the art better understand solutions of this application, the following clearly and completely describes the technical solutions in the embodiments of this application with reference to the accompanying drawings in the embodiments of this application. Apparently, the described embodiments are merely a part rather than all of the embodiments of this application. All other embodiments obtained by a person of ordinary skill in the art based on the embodiments of this application without creative efforts shall fall within the protection scope of this application.

The terms such as "first" and "second" in the specification, the claims, and the foregoing accompanying drawings of this application are intended to distinguish between similar objects, but are not necessarily used for describing a specific sequence or a chronological order. It is to be understood that the data termed in such a way are interchangeable in proper circumstances, so that the embodiments of this application described herein can be implemented in orders other than the order illustrated or described herein. Moreover, the terms "include", "comprise" and any other variants thereof mean are intended to cover the non-exclusive inclusion. For example, a process, method, system, product, or device that includes a list of steps or units is not necessarily limited to those expressly listed steps or units, but may include other steps or units not expressly listed or inherent to such a process, method, product, or device.

Technical terms involved in the embodiments of this application include:

(1) A mobile terminal, generally referred to as a mobile phone, includes, but is not limited to, all handheld portable interactive devices, such as handheld portable game devices.

(2) Shooting games include, but are not limited to, all games that use hot weapons for long-range attack, such as first-person shooter games and third-person shooter games.

(3) An unmanned operation is a control operation of remotely controlling a UAV.

Figure 1:
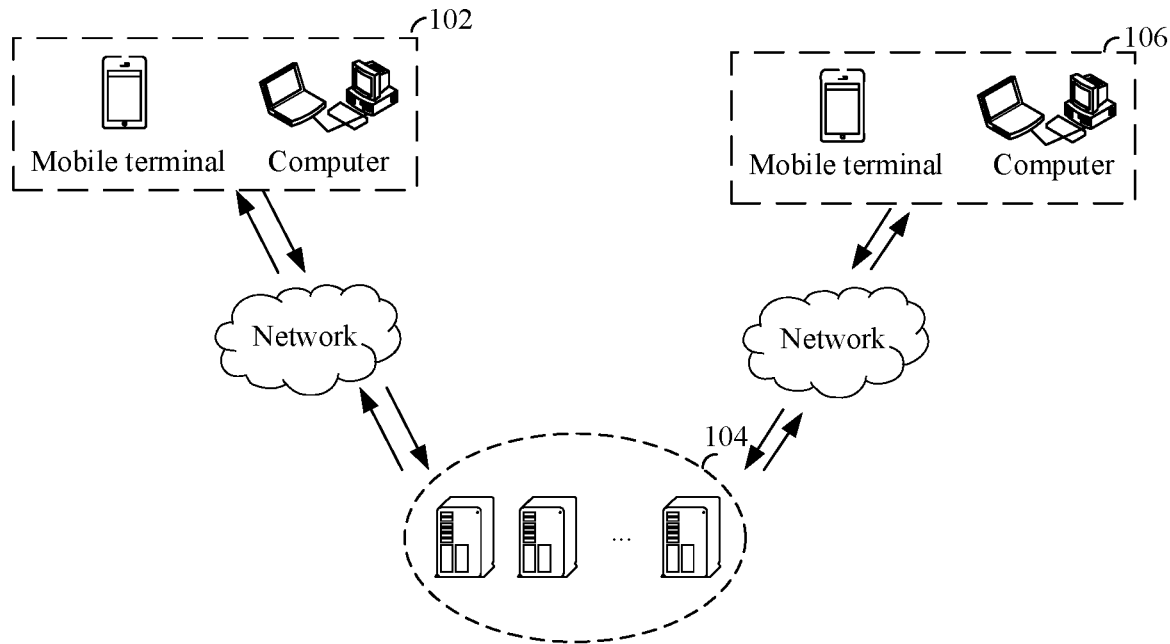
FIG. 1 is a schematic diagram of an application environment of a virtual UAV control method according to an embodiment of this application.

According to one aspect of the embodiments of this application, a virtual UAV control method is provided. In some embodiments, the virtual UAV control method is applicable to, but not limited to, an application environment shown in FIG. 1. As shown in FIG. 1, a client (for example, Android, iOS, or Web) with a target interactive application is run on a first terminal device 102. Through the client, a user may perform a network interactive task (for example, a virtual shooting game), an interactive picture within a field of view of a first virtual operation object in a currently running one-round interactive task is displayed in an interactive scene of a target interactive application, and a server 104, through a network, processes various operation data generated by the user in the target interactive application. The server 104 may be a back-end server of the client. In response to a virtual UAV of the first virtual operation object is in a target state, the server 104 responds to a first target operation, and then causes the first terminal device 102 through the network to call the virtual UAV in the target interactive application. Then, in the first terminal device 102, an interactive picture within a field of view of the virtual UAV is displayed in the target interactive application, and a second terminal device 106 may further interact with the first terminal device through the network and the server 104. For example, a user corresponding to the first terminal device and a user corresponding to the second terminal device interact in the same interactive task in the form of competition. The foregoing is merely an example. This is not limited in this embodiment of this application herein. "In the target state" indicates that a user is allowed to use the virtual UAV.

In an interactive interface of the first terminal device 102 or the second terminal device 106, the interactive picture within the field of view of the first virtual operation object is displayed in the currently running one-round interactive task in the target interactive application. The virtual UAV is called in the target interactive application in response to the first target operation in response to the virtual UAV of the first virtual operation object is in a target state. The interactive picture within the field of view of the virtual UAV is displayed in the target interactive application.

In some embodiments, the terminal device (including the first terminal device and the second terminal device) may be a terminal device provided with a client, and may include at least one of the following: a mobile phone (for example, an Android mobile phone or an iOS mobile phone), a notebook computer, a tablet computer, a palmtop computer, a mobile Internet device (MID), a PAD, and a desktop computer, but is not limited thereto. The foregoing network may include, but is not limited to, a wired network and a wireless network. The wired network includes: a local area network, a metropolitan area network, and a wide area network. The wireless network includes Bluetooth, WiFi, and other networks that achieve wireless communication. The foregoing server may be a single server or a server cluster that includes a plurality of servers. The foregoing is merely an example. This is not limited in this embodiment.

Figure 2:
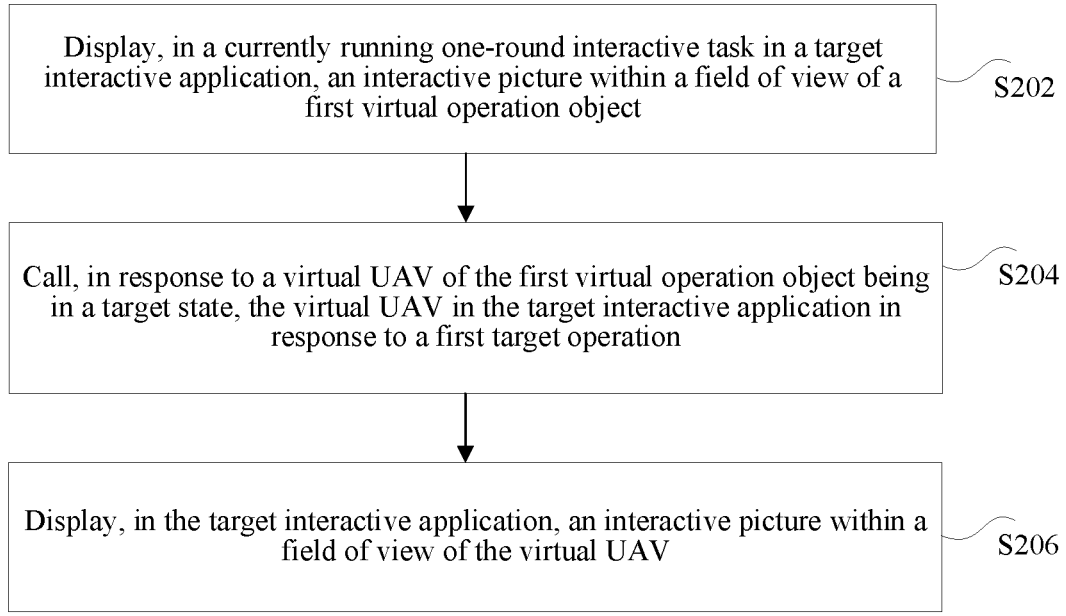
FIG. 2 is a schematic flowchart of an virtual UAV control method according to an embodiment of this application.

In some embodiments, the method may be performed by a server or by a terminal device, or jointly performed by a server and a terminal device. In this embodiment, description is provided by using an example in which the method is performed by a terminal device (for example, the foregoing first terminal device 102). As shown in FIG. 2, a process of the foregoing virtual UAV control method may include the following steps.

S202. Display, in a currently running one-round interactive task in a target interactive application, an interactive picture within a field of view of a first virtual operation object.

S204. Call, in response to a virtual UAV of the first virtual operation object is in a target state, the virtual UAV in the target interactive application in response to a first target operation.

S206. Display, in the target interactive application, an interactive picture within a field of view of the virtual UAV.

In some embodiments, the foregoing virtual UAV control method may be used in, but is not limited to, scenes in which the client is used for target interactive applications (such as target game applications, specifically virtual shooting games). When the target interactive application is a target game application, the foregoing interactive picture may refer to a game picture.

For example, in the target game application, the user may play a game by using the client running on the terminal.

In a process of performing the target interactive application, in a current one-round interactive task, firstly, an interactive picture within a field of view of a first virtual operation object is displayed. When calling of a virtual UAV of the first virtual operation object is triggered by touching a screen, the virtual UAV is called. Then, the interactive picture is switched to an interactive picture corresponding to the virtual UAV. It is to be understood that the foregoing is merely an example. No limitation is made thereto in this embodiment of this application herein.

Through this embodiment, when a target interactive application is a target game application, firstly, in a game scene of the target game application, a game picture within a field of view of a first virtual operation object is displayed in a currently running one-round game. If a virtual UAV of the first virtual operation object is in an allowed-for-use state and a user triggers a first target operation, the virtual UAV is called in the target game application in response to the first target operation. Then, a picture within a field of view of the virtual UAV is displayed in a target game application. An objective of displaying a game picture within the field of view of the virtual UAV in the target game application is achieved, thereby switching, in a game scene, a game picture within the field of view of the first virtual operation object to a game picture within the field of view of the virtual UAV and resolving the technical problem in the related art that a field of view is single when searching the enemy track in a virtual shooting game.

The foregoing virtual UAV control method in this embodiment is described below with reference to FIG. 2.

In S202, an interactive picture within a field of view of a first virtual operation object in a currently running one-round interactive task is displayed in a target interactive application.

In some embodiments, the foregoing target interactive application may be an interactive application with moving virtual interactive characters, for example, a target shooting interactive application. The target interactive application may be an online interactive application or a mobile phone interactive application. The first virtual operation object may be understood as a virtual interactive character with a moving function or the like. The first virtual operation object may be operated by holding down a key on a keyboard, or the first virtual operation object is operated by touching a corresponding screen position in an interactive scene of a target interactive application run on a mobile terminal (for example, a mobile phone). It is to be understood that the foregoing is merely an example. This is not limited in this embodiment of this application herein.

In the interactive scene of the target interactive application, an interactive picture within a field of view of a first virtual operation object can be displayed in a current one-round interactive task. For example, the interactive picture is displayed from a first perspective or from a third perspective.

In some embodiments, before the interactive picture within the field of view of the first virtual operation object in the currently running one-round interactive task is displayed in the target interactive application, a fourth touch operation is acquired from a preparation interface before the one-round interactive task starts; and configuration parameters of the virtual UAV are acquired in response to the fourth touch operation, where the configuration parameters is used for indicating that the first virtual operation object calls the virtual UAV after the one-round interactive task starts. That is to say, a user operating the first virtual operation object can use the virtual UAV after the one-round interactive task starts.

In some embodiments, in an interactive scene of the target interactive application, on a preparation interface before the current one-round interactive task starts, if a fourth touch operation is acquired, configuration parameters of the virtual UAV are acquired in response to the fourth touch operation, so as to allow the use of the virtual UAV after the one-round interactive task starts. Then, after the one-round interactive task starts, the interactive picture within the field of view of the first virtual operation object is displayed.

Through this embodiment, whether a virtual UAV is allowed for use after interaction starts may be configured for the first virtual operation object on a preparation interface of a one-round interactive task, so that a user can freely select configuration in the one-round interactive task, improving interactive experience of the user.

In S204, in response to a virtual UAV of the first virtual operation object is in a target state, the virtual UAV is called in the target interactive application in response to a first target operation. The target state may be an allowed-for-use state, that is, the virtual UAV in the target state indicates that the virtual UAV is allowed for use. For example, a user may use the virtual UAV during a game. If the virtual UAV is not in the target state, the virtual UAV is not allowed for use.

In a game scene, taking a mobile phone game as an example, the first virtual operation object may be selectively provided with a function of a virtual UAV. The virtual UAV is used for acquiring a game picture within a field of view of the virtual UAV in the foregoing target game application. If the virtual UAV is allowed for use and a user triggers a first target operation by tapping a mobile phone screen, the virtual UAV is called in response to the first target operation. It is to be understood that the foregoing is merely an example. No limitation is made herein.

In S206. Display, in the target interactive application, an interactive picture within a field of view of the virtual UAV.

In the target interactive application, after the virtual UAV is called through the above step, the interactive picture within the field of view of the first virtual operation object is switched to the interactive picture within the field of view of the virtual UAV.

For example, the interactive picture within the field of view of the first virtual operation object may be displayed from a perspective of horizontally looking at a building in an interactive world, the interactive picture within the field of view of the virtual UAV may be displayed from a perspective of overlooking the building in the interactive world, and both the interactive picture within the field of view of the first virtual operation object and the interactive picture within the field of view of the virtual UAV are dynamic interactive pictures. It is to be understood that no limitation is made thereto in this embodiment.

In some embodiments, an operation interface of the virtual UAV is displayed in the target interactive application in response to the interactive picture within the field of view of the virtual UAV is displayed in the target interactive application, where the operation interface is displayed with predetermined transparency on the interactive picture within the field of view of the virtual UAV, the operation interface includes a first set of virtual buttons, and the first set of virtual buttons are used for controlling the virtual UAV to ascend and descend in a three-dimensional virtual space of the one-round interactive task. The first set of virtual buttons include a first virtual button and a second virtual button.

In some embodiments, in an interactive scene of the target interactive application, an operation interface of the virtual UAV may be displayed on a display interface of the target interactive application in response to the interactive picture within the field of view of the virtual UAV is displayed. The operation interface has predetermined transparency. The operation interface includes a first set of virtual buttons. The virtual UAV can be controlled through the first set of virtual buttons to ascend or descend (move upward or move downward) in a three-dimensional virtual space of an interactive world of the one-round interactive task, and the operation interface is displayed on the interactive picture within the field of view of the virtual UAV. The first set of virtual buttons may include one or more virtual buttons. This is not limited herein.

Through this embodiment, in an interactive scene, the virtual UAV may be controlled to ascend and descend through the first set of virtual buttons, so that the user can adjust a display of the interactive picture in the interactive world, which makes it easier for the user to search for an enemy track or control interaction, effectively improves the user's ability for tracking in the interaction, and improves interactive experience of the user.

In some embodiments, the displaying an operation interface of the virtual UAV in the target interactive application includes: displaying a second set of virtual buttons on the operation interface, where the second set of virtual buttons are used for controlling the virtual UAV to move on a plane in the three-dimensional virtual space; or displaying a second set of virtual buttons and a third set of virtual buttons on the operation interface, where the second set of virtual buttons are used for controlling the virtual UAV to move on a plane in the three-dimensional virtual space, and the third set of virtual buttons are used for controlling the virtual UAV to perform an attack operation.

In some embodiments, in an interactive scene of the target interactive application, an operation interface of the virtual UAV may be displayed in response to the interactive picture within the field of view of the virtual UAV is displayed, and a second set of virtual buttons are displayed on the operation interface. The virtual UAV may be controlled through the second set of virtual buttons to move on a plane (move around on a plane) in a three-dimensional virtual space of an interactive world of the one-round interactive task.

Alternatively, a second set of virtual buttons and a third set of virtual buttons are displayed on the operation interface. In a three-dimensional virtual space of an interactive world (such as a game world) of the one-round interactive task, the virtual UAV may be controlled through the second set of virtual buttons to move on a plane (move around on a plane), and the virtual UAV may be controlled through the third set of virtual buttons to perform an attack operation (such as fire a bullet or a grenade).

Both the second set of virtual buttons and the third set of virtual buttons may include one or more virtual buttons.

It is to be understood that the foregoing is merely an example. No limitation is made thereto in this embodiment.

Through this embodiment, by using the foregoing technical solution, the virtual UAV may be controlled through the second set of virtual buttons to move around on a plane, so that the user has a rich interactive experience through the virtual UAV. The virtual UAV may be controlled through the third set of virtual buttons to perform an attack operation, so that skills of the virtual UAV are more abundant and interesting. The user can attack an enemy in a timely manner when finding an enemy track through the virtual UAV, which improves the user's ability for attack in interaction and improves interactive experience of the user.

In some embodiments, the displaying, in the target interactive application, an interactive picture within a field of view of the virtual UAV includes: acquiring a second target operation from the target interactive application; controlling, in response to the second target operation, the virtual UAV to move to a first target position; and displaying a target interactive picture in the target interactive application, where the target interactive picture is an interactive picture within the field of view of the virtual UAV at the first target position.

In some embodiments, in an interactive scene of the target interactive application, in response to the interactive picture within the field of view of the virtual UAV is displayed, if a second target operation of the user is acquired, the second target operation is responded to, then the virtual UAV is controlled to move to a first target position indicated by the second target operation, and then a target interactive picture is displayed in the target interactive application. The target interactive picture is an interactive picture within the field of view of the virtual UAV at the first target position.

For example, in a game scene of a target game application, after a virtual UAV is called, a player may control the virtual UAV to move to a first target position A through an operation interface of the virtual UAV. In this case, a game picture corresponding to the virtual UAV at the first target position A is displayed on a game interface of the target game application.

It is to be understood that the foregoing is merely an example. This is not limited in this embodiment herein.

Through this embodiment, in an interactive scene, when a second touch operation is acquired, the UAV may be controlled to move to a first target position, and an interactive picture within a field of view of the virtual UAV at the first target position is presented in the target interactive application, so that the user has a rich interactive experience through the virtual UAV, which improves interactive experience of the user.

In some embodiments, the acquiring a second target operation from the target interactive application includes: acquiring, from the target interactive application, a first touch operation performed on a first virtual button in the operation interface of the virtual UAV, where the operation interface of the virtual UAV is displayed with predetermined transparency on the interactive picture within the field of view of the virtual UAV, the first virtual button is used for controlling the virtual UAV to ascend in a three-dimensional virtual space of the one-round interactive task, and the second target operation includes the first touch operation. The controlling, in response to the second target operation, the virtual UAV to move to a first target position includes: controlling, in response to the first touch operation, the virtual UAV to ascend from a first position in the three-dimensional virtual space to a second position, where the first target position includes the second position.

In some embodiments, in an interactive scene of the target interactive application, in response to the interactive picture within the field of view of the virtual UAV is displayed, if a first touch operation (the second target operation includes the first touch operation) performed by the user on a first virtual button in the operation interface of the virtual UAV is acquired, in response to the first touch operation, the virtual UAV ascends (ascend from a first position to a second position) in a three-dimensional virtual space of interaction. The operation interface has predetermined transparency, and the operation interface is displayed on the interactive picture within the field of view of the virtual UAV. The first virtual button is used for controlling the virtual UAV to ascend in the three-dimensional virtual space of the one-round interactive task, and the first target position includes the second position.

For example, in a target game application, a virtual UAV may be controlled to ascend from a first position to a second position when a first touch operation is acquired through an operation interface of the virtual UAV.

It is to be understood that the foregoing is merely an example. This is not limited in this embodiment herein.

Through this embodiment, in an interactive scene, a first touch operation is performed through a first virtual button on an operation interface of a virtual UAV, so that the virtual UAV can be controlled to ascend from a first position to a second position, which enables a user to flexibly control movement of the virtual UAV and improves interactive experience of the user.

In some embodiments, the acquiring a second target operation from the target interactive application includes: acquiring, from the target interactive application, a second touch operation performed on a second virtual button in the operation interface of the virtual UAV, where the operation interface of the virtual UAV is displayed with predetermined transparency on the interactive picture within the field of view of the virtual UAV, the second virtual button is used for controlling the virtual UAV to descend in a three-dimensional virtual space of the one-round interactive task, and the second target operation includes the second touch operation. The controlling, in response to the second target operation, the virtual UAV to move to a first target position includes: controlling, in response to the second touch operation, the virtual UAV to descend from a third position in the three-dimensional virtual space to a fourth position, where the first target position includes the fourth position.

In some embodiments, in an interactive scene of the target interactive application, in response to the interactive picture within the field of view of the virtual UAV is displayed, if a second touch operation (the second target operation includes the second touch operation) performed by the user on a second virtual button in the operation interface of the virtual UAV is acquired, in response to the second touch operation, the virtual UAV descends (descend from a third position to a fourth position) in a three-dimensional virtual space of interaction. The operation interface has predetermined transparency, and the operation interface is displayed on the interactive picture within the field of view of the virtual UAV. The second virtual button is used for controlling the virtual UAV to descend in a three-dimensional virtual space of the one-round interactive task, and the first target position includes the fourth position.

For example, in a target game application, a virtual UAV may be controlled to descend from a third position to a fourth position when a second touch operation is acquired through an operation interface of the virtual UAV.

It is to be understood that the foregoing is merely an example. This is not limited in this embodiment herein.

Through this embodiment, in an interactive scene, a second touch operation is performed through a second virtual button on an operation interface of a virtual UAV, so that the virtual UAV can be controlled to descend from a third position to a fourth position, which enables a user to flexibly control movement of the virtual UAV and improves interactive experience of the user.

In some embodiments, after the virtual UAV is controlled, in response to the second target operation, to move to the first target position, prompt information is displayed in the target interactive application in response to an altitude of the first target position is a preset maximum altitude, where the prompt information is used for prompting that the virtual UAV is already at the maximum altitude.

In some embodiments, in an interactive scene of the target interactive application, after the virtual UAV moves, in response to the second touch operation, to the first target position, prompt information is displayed in the target interactive application if the first target position is at a preset maximum altitude in the interactive scene. For example, a gray first virtual button is displayed on the operation interface of the virtual UAV, so that the user cannot control, through the first virtual button, the virtual UAV to ascend, which prompts the user that the virtual UAV is already at the maximum altitude.

Through this embodiment, in an interactive scene, prompt information is displayed, so that a user can be prompted that a virtual UAV is already at a maximum altitude, which prevents the user from controlling the virtual UAV to ascend all the time in the interactive scene, saves unnecessary overheads in interaction, makes the interaction more humanized, and improves interactive experience of the user.

In some embodiments, prompt information is displayed in the target interactive application, and a first virtual button is displayed as being in an untouchable state in the target interactive application, where the first virtual button is a virtual button in the operation interface of the virtual UAV, the operation interface of the virtual UAV is displayed with predetermined transparency on the interactive picture within the field of view of the virtual UAV, and the first virtual button is used for controlling the virtual UAV to ascend in a three-dimensional virtual space of the one-round interactive task.

In some embodiments, in an interactive scene of the target interactive application, after the virtual UAV moves, in response to the second touch operation, to the first target position, prompt information is displayed in the target interactive application if the first target position is at a preset maximum altitude in the interactive scene. The prompt information may be displaying the first virtual button as being in an untouchable state (such as displaying as a gray button).

Therefore, the user cannot control, through the first virtual button, the virtual UAV to ascend, which prompts the user that the virtual UAV is already at the maximum altitude.

Through this embodiment, in an interactive scene, prompt information is displayed, so that a user can be prompted that a virtual UAV is already at a maximum altitude, which prevents the user from controlling the virtual UAV to ascend all the time in the interactive scene, saves unnecessary overheads in interaction, makes the interaction more humanized, and improves interactive experience of the user.

In some embodiments, a third touch operation performed on a third virtual button in the operation interface of the virtual UAV is acquired from the target interactive application in response to the interactive picture within the field of view of the virtual UAV is displayed in the target interactive application, where the operation interface of the virtual UAV is displayed with predetermined transparency on the interactive picture within the field of view of the virtual UAV, and the third virtual button is used for controlling the virtual UAV to perform an attack operation; and the virtual UAV is controlled, in response to the third touch operation, to perform the attack operation.

In some embodiments, the third set of virtual buttons include a third virtual button. In an interactive scene of the target interactive application, in response to the interactive picture within the field of view of the virtual UAV is displayed, if a third touch operation performed on a third virtual button in the operation interface of the virtual UAV is acquired, the virtual UAV is controlled, in response to the third touch operation, to perform an attack operation, such as fire a bullet or drop a throwing weapon (for example, a grenade).

Through this embodiment, in an interactive scene of a target interactive application, a virtual UAV may be controlled to perform an attack operation after a third touch operation is acquired. Making the virtual UAV perform an attack operation increases interactive fun of virtual shooting interaction and improves interactive experience of users.

In some embodiments, before the virtual UAV is called in the target interactive application in response to the first target operation, the virtual UAV of the first virtual operation object is set to be in the target state in response to an operation result of the first virtual operation object in the one-round interactive task meeting a predetermined condition.

In some embodiments, in response to the interactive picture within the field of view of the first virtual operation object in the currently running one-round interactive task is displayed in the target interactive application, the virtual UAV of the first virtual operation object may be set to be in the target state if an operation result of the first virtual operation object in the one-round interactive task meeting a predetermined condition.

Through this embodiment, in an interactive scene of a target interactive application, a virtual UAV can be set to an allowed-for-use state only provided that a specific predetermined condition is met, which increases the difficulty in obtaining skills of the virtual UAV, increases interactive fun, and improves interactive experience of users.

In some embodiments, the setting the virtual UAV of the first virtual operation object to be in the target state in response to an operation result of the first virtual operation object in the one-round interactive task meeting a predetermined condition includes: setting the virtual UAV of the first virtual operation object to be in the target state in response to a quantity of virtual operation objects killed by the first virtual operation object in the one-round interactive task is greater than a predetermined quantity; or setting the virtual UAV of the first virtual operation object to be in the target state in response to the first virtual operation object moves to a second target position in the one-round interactive task; or setting the virtual UAV of the first virtual operation object to be in the target state in response to the first virtual operation object touches a target virtual prop in the one-round interactive task.

In some embodiments, in a one-round interactive task of an interactive scene of the target interactive application, the virtual UAV of the first virtual operation object may be set to be in the target state if a quantity of virtual operation objects killed by the first virtual operation object exceeds a predetermined quantity (for example, 10).

Alternatively, in a one-round interactive task of an interactive scene of the target interactive application, the virtual UAV of the first virtual operation object may be set to be in the target state if the first virtual operation object moves to a second target position. For example, the second target position is a hidden map, and the like.

Alternatively, in a one-round interactive task of an interactive scene of the target interactive application, the virtual UAV of the first virtual operation object may be set to be in the target state if the first virtual operation object touches a target virtual prop. For example, the target virtual prop is an airdrop bag, hidden equipment, or the like.

It is to be understood that the foregoing is merely an example. No limitation is made thereto in this embodiment herein.

Through this embodiment, according to the foregoing methods, whether a virtual UAV is in an allowed-for-use state can be set. Flexible setting of an on state of the virtual UAV improves the flexibility of interaction and improves fun of the interaction.

In some embodiments, after the interactive picture within the field of view of the virtual UAV is displayed in the target interactive application, the virtual UAV in the target interactive application is deactivated and the interactive picture within the field of view of the first virtual operation object is displayed in the target interactive application in response to a service duration of the virtual UAV reaches a predetermined duration.

In some embodiments, in an interactive scene of the target interactive application, after the interactive picture within the field of view of the virtual UAV is displayed, the virtual UAV may be deactivated and display of the interactive picture within the field of view of the virtual UAV is switched to display of the interactive picture within the field of view of the first virtual operation object in response to a service duration of the virtual UAV reaches a predetermined duration (for example, 30 s).

Through this embodiment, in an interactive scene of a target interactive application, a service duration of a virtual UAV is limited, which avoids proliferation of virtual UAVs in the interactive scene, reduces unnecessary overheads of interaction, and improves fun of the interaction.

Reconnaissance is a very important combat mode in current shooting games. In most current games, all existing reconnaissance methods are to scan a mini-map and then display an enemy track on the mini-map, such as position information and the quantity of opponents. Such reconnaissance methods are relatively simple, a field of view presented is relatively single and limited, and an enemy is easy to be omitted. As a result, players cannot fully understand a situation of the enemy in real time, and there is a drawback that the situation of the enemy cannot be truly reflected, leading to a poor game experience for users.

To resolve the foregoing problems, this embodiment provides an implementation solution for controlling a virtual UAV. The method is applicable to shooting games. A UAV (with the same function as the foregoing virtual UAV) is generated in a game, and then a camera perspective (an ordinary game picture perspective) is switched to a perspective of the UAV. Game scenes wherever the UAV goes can be seen in real time by remotely controlling the UAV. When a player uses the UAV, a perspective is switched to the UAV flying in the air. By controlling the UAV, the player can detect an enemy camp in the game and grasp details of enemies, such as equipment conditions and position information of the enemies, which improves a probability of winning against the enemies, increases fun of the game, and greatly improves quality of the game.

Figure 3:
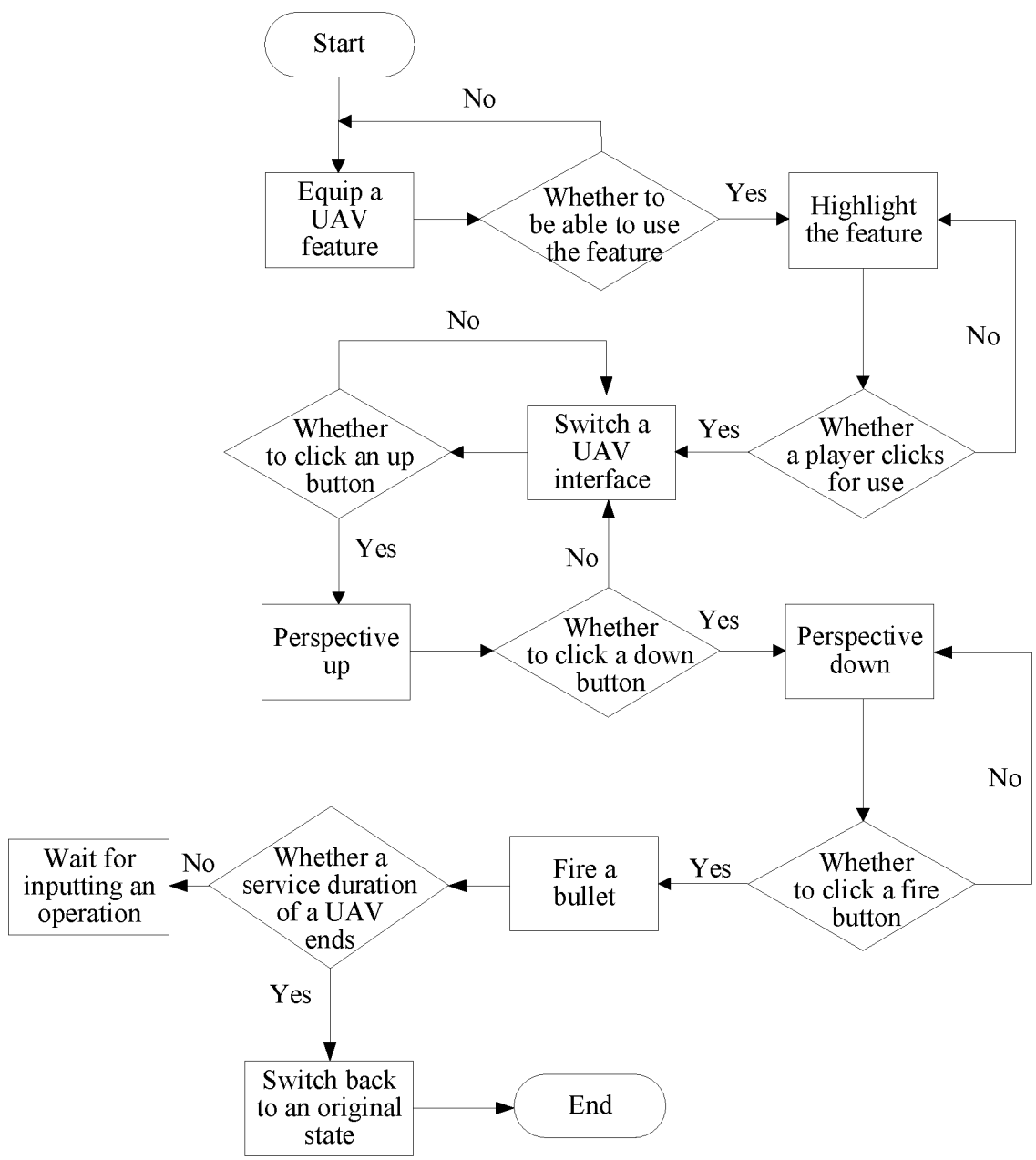
FIG. 3 is a schematic flowchart of another virtual UAV control method according to an embodiment of this application.

A process of the virtual UAV control method is described below with reference to various examples. As shown in FIG. 3, the method includes the following steps.

Step 1. A player equips a UAV feature before a game starts. For example, killing a specific quantity of enemies during the game may obtain points to activate the UAV feature.

Figure 4:
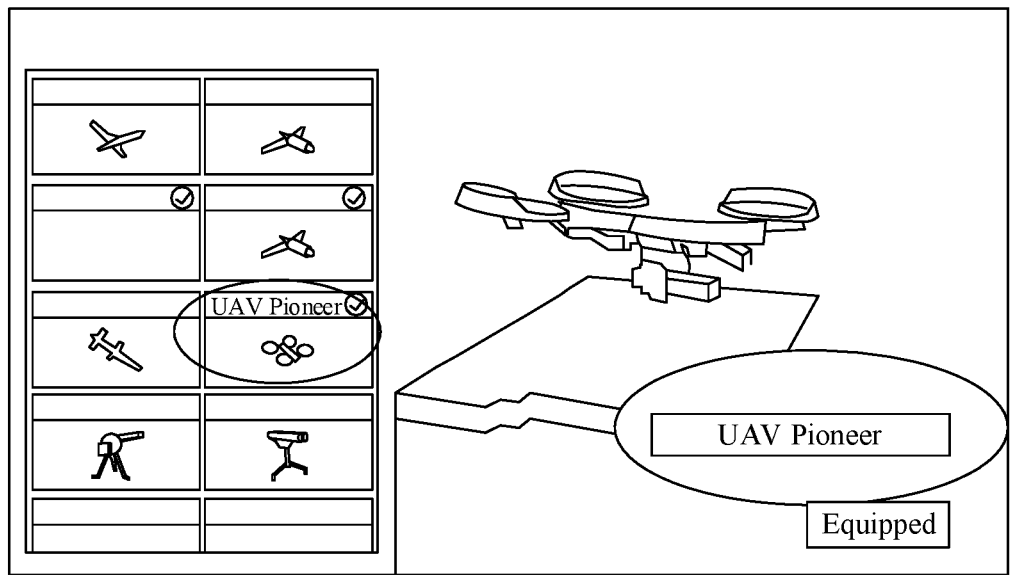
FIG. 4 is a schematic diagram of another UAV feature configuration according to an embodiment of this application.

As shown in FIG. 4, in a game scene, on a preparation interface, unlike an ordinary weapon, a UAV cannot be switched on as an ordinary weapon, the UAV feature needs to be used as a player skill. First, the UAV feature needs to be equipped before a game starts. The UAV feature corresponds to the foregoing virtual UAV.

Since a UAV is more powerful than an ordinary weapon, the UAV cannot be used as freely as other ordinary weapons. For example, the UAV feature can be activated by the player killing a specific quantity of enemies and gaining a specific quantity of points in a mobile game. For example, 10 points are gained when an enemy is killed, and the UAV feature can be used when the score reaches 50 points.

Figure 5:
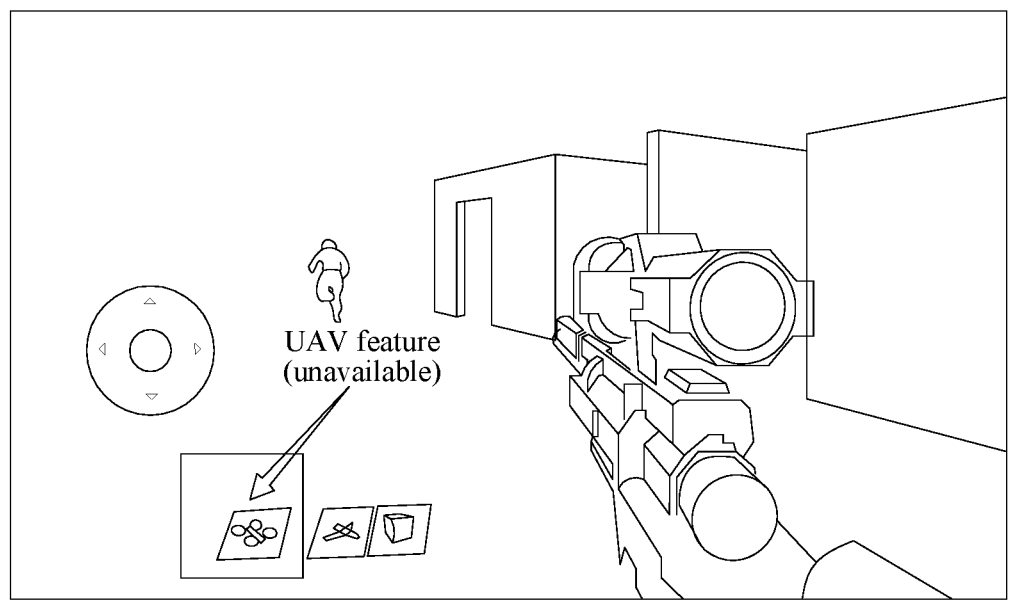
FIG. 5 is a schematic diagram of an unavailable UAV according to an embodiment of this application.

In FIG. 5, a UAV feature is not activated and is in an unavailable state. For example, a button corresponding to the UAV feature is gray and cannot be operated. The figure is in black and white. When the UAV feature is not activated and is in an unavailable state, the button corresponding to the UAV feature may be displayed in gray.

Step 2. The UAV feature is highlighted and waits for the player to click and use the UAV feature after an activation condition is met.

Figure 6:
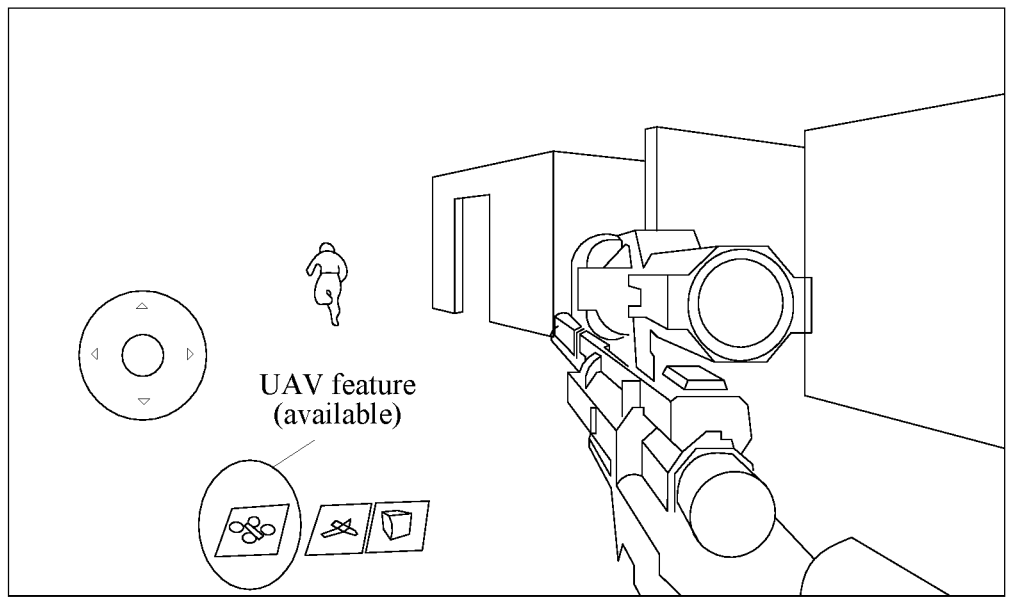
FIG. 6 is a schematic diagram of an allowed-for-use UAV according to an embodiment of this application.

As shown in FIG. 6, a UAV feature is activated and in an available state. For example, a button corresponding to the UAV feature is in a highlighted state, and the button can be operated. The figure is in black and white. When the UAV feature is activated and in an available state, the button corresponding to the UAV feature may be displayed in a highlighted state.

Step 3. The player clicks and uses the UAV feature, and after the player uses a UAV, a UAV model is generated.

Figure 7:
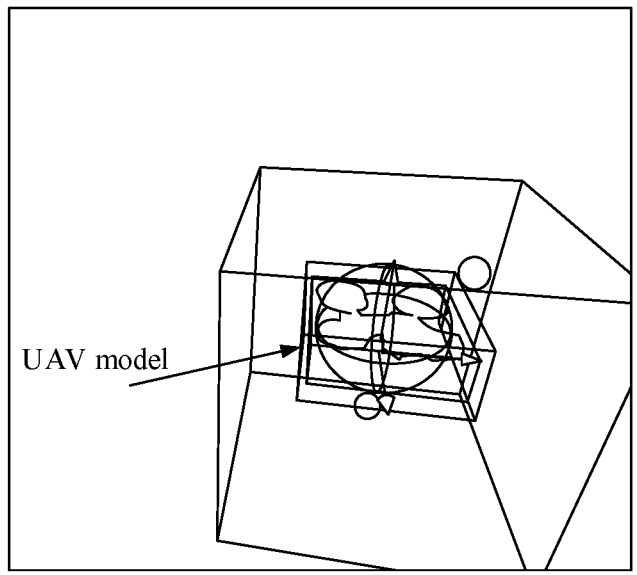
FIG. 7 is a schematic diagram of a UAV model according to an embodiment of this application.
Figure 8:
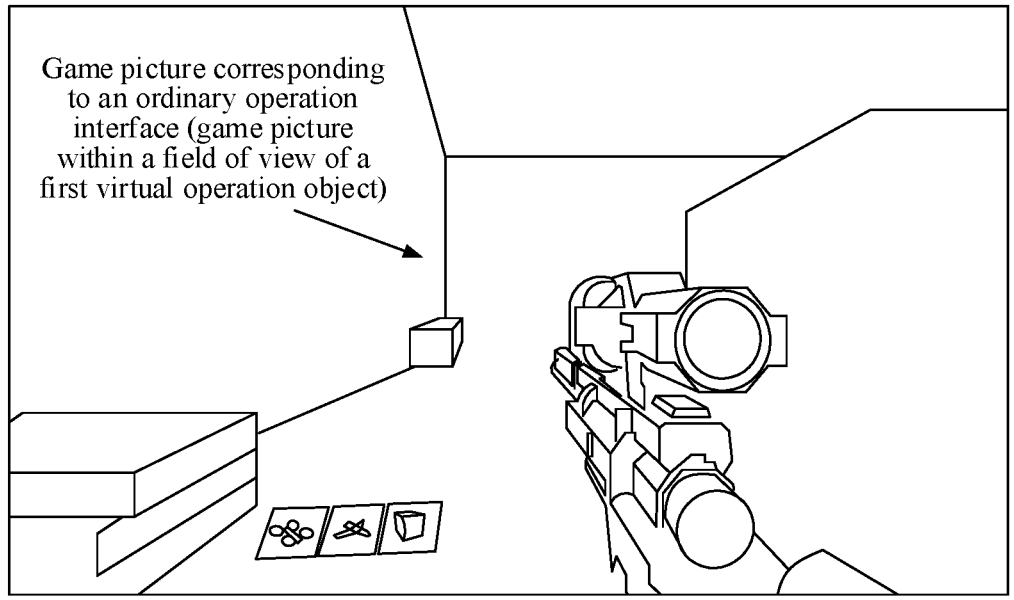
FIG. 8 is a schematic diagram of an interactive picture within a field of view of a first virtual operation object according to an embodiment of this application.
Figure 9:
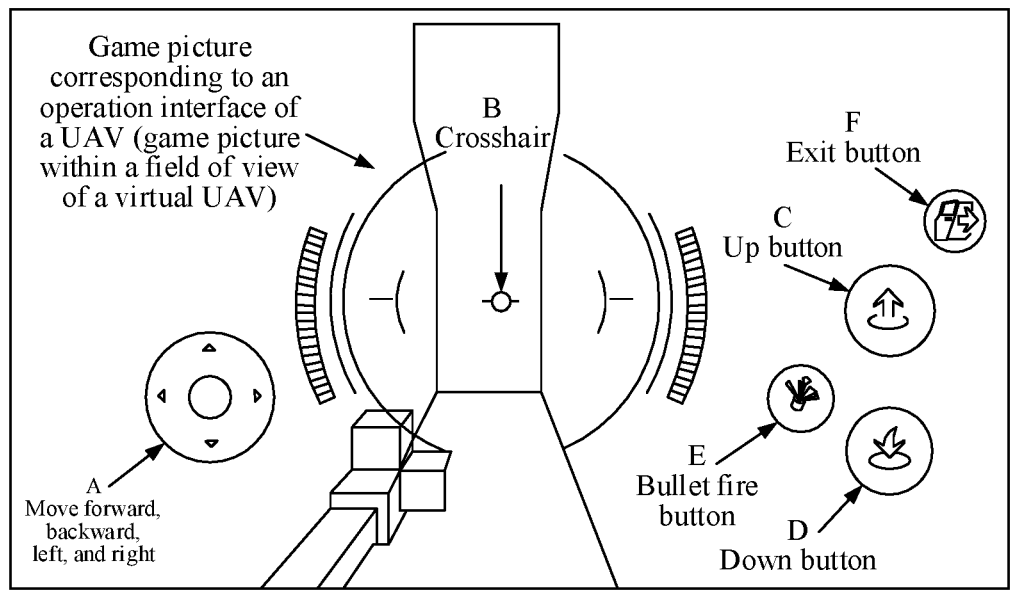
FIG. 9 is a schematic diagram of an interactive picture within a field of view of a virtual UAV according to an embodiment of this application.

FIG. 7 illustrates a UAV model. After a player uses the UAV feature, a game picture corresponding to an ordinary operation interface is switched to a game picture corresponding to a UAV operation interface. FIG. 8 illustrates a game picture corresponding to an ordinary operation interface (corresponding to the game picture within the field of view of the first virtual operation object). FIG. 9 illustrates a game picture corresponding to a UAV operation interface (corresponding to the game picture within the field of view of the virtual UAV).

Step 4. The player modifies an altitude of the UAV in the air by pressing an up button and a down button.

During the game, a camera may move with the UAV. Accordingly, a flying function of the UAV can be emulated.

As shown in FIGS. 9, A, C, D, E, and F are buttons corresponding to a UAV operation interface. Operation meanings indicated by the buttons are as follows: A denotes moving forward, backward, left, and right; C denotes an up button; D denotes a down button; E denotes a bullet fire button; F denotes an exit button; and a small circle corresponding to B denotes a crosshair mark of the UAV aiming at a target.

The UAV may be used to inspect an entire map and may be further provided with a function of firing bullets. However, a main function of the UAV is to inspect enemies. For example, the UAV may be provided with only 3 bullets. After the 3 bullets are used up, the UAV can still be used but cannot fire, and can only fire next time the UAV feature is used.

Step 5. The player may press a button long enough to make the UAV ascend. During ascending, if the UAV reaches the highest altitude that the UAV can fly, the player is reminded not to make the UAV to fly upward. An altitude position of the UAV may be acquired and then compared with data of planned configuration, so that an operation of the up button is shielded when the altitude position is greater than or equal to a value of the planned configuration.

Figure 10:
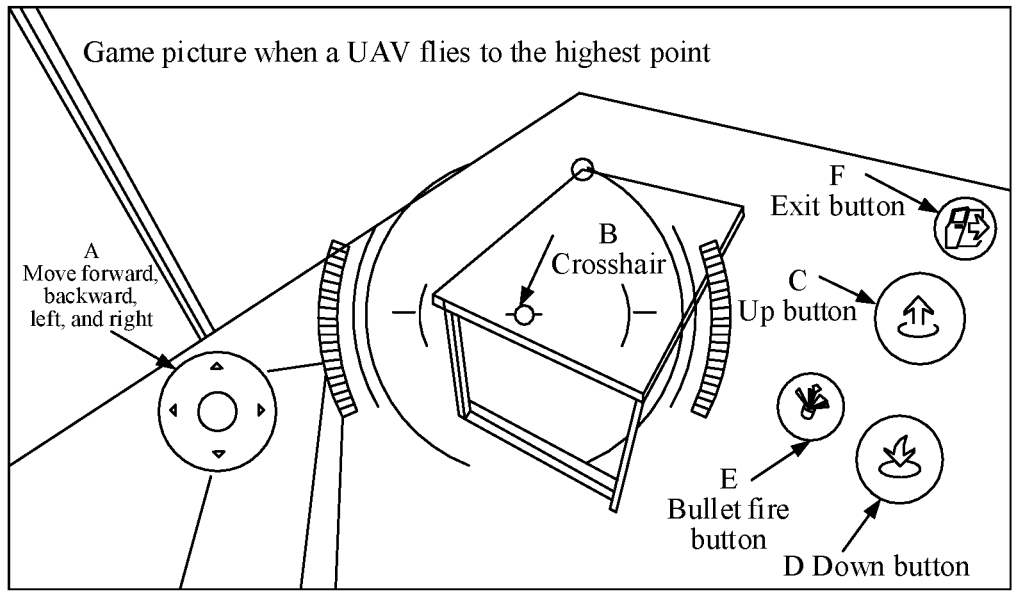
FIG. 10 is a schematic diagram of a virtual UAV at a maximum altitude according to an embodiment of this application.

FIG. 10 illustrates a picture when a UAV flies to the highest point. A, C, D, E, and F are buttons corresponding to a UAV operation interface. Operation meanings indicated by the buttons are as follows: A denotes moving forward, backward, left, and right; C denotes an up button; D denotes a down button; E denotes a bullet fire button; F denotes an exit button; and a small circle corresponding to B denotes a crosshair mark of the UAV aiming at a target.

Step 6. The player may select a state of exiting early or waiting for the end of a service duration of the UAV to exit the UAV, and then an original weapon holding state may be switched back to after the end.

Through this embodiment, game scenes wherever a UAV goes can be seen in real time by remotely controlling the UAV. When a player uses the UAV, a perspective may be switched to the UAV flying in the air. By controlling the UAV, the player can detect an enemy camp in the game and grasp details of enemies, such as equipment conditions and position information of the enemies, which improves a probability of winning against the enemies, increases fun of the game, and greatly improves quality of the game.

FIG. 2 and FIG. 3 are schematic flowcharts of a virtual UAV control method according to an embodiment. It is to be understood that the steps in FIG. 2 and FIG. 3 are sequentially displayed as indicated by arrows, but the steps are not necessarily sequentially performed in an order indicated by the arrows. Unless otherwise clearly specified in this specification, the steps are performed without any strict sequence limit, and may be performed in other orders. In addition, at least some steps in FIG. 2 and FIG. 3 may include a plurality of sub-steps or a plurality of stages, and these sub-steps or stages are not necessarily performed at a same time instant, and may be performed at different time instants. The sub-steps or stages are not necessarily performed in sequence, and the sub-steps or stages may be performed alternately with at least some of other steps, sub-steps or stages of other steps.

For ease of description, the foregoing method embodiments are stated as a series of action combinations. However, a person skilled in the art needs to know that this application is not limited on the sequence of the described actions because according to this application, some steps may use another sequence or may be simultaneously performed. In addition, a person skilled in the art needs to know that, the embodiments described in the specification are all exemplary embodiments and the related actions and modules are not mandatory to this application.

Figure 11:
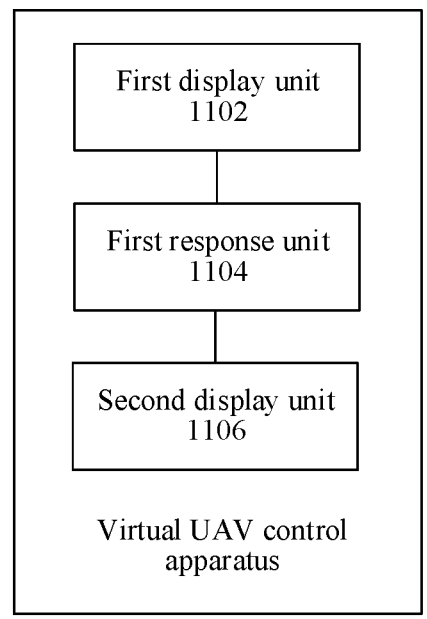
FIG. 11 is a schematic structural diagram of a virtual UAV control apparatus according to an embodiment of this application.

According to another aspect of the embodiments of this application, a virtual UAV control apparatus is further provided. As shown in FIG. 11, the apparatus includes:

(1) a first display unit 1102, configured to display, in a currently running one-round interactive task in a target interactive application, an interactive picture within a field of view of a first virtual operation object;

(2) a first response unit 1104, configured to call, in response to a virtual UAV of the first virtual operation object is in an allowed-for-use state, the virtual UAV in the target interactive application in response to a first target operation; and (3) a second display unit 1106, configured to display, in the target interactive application, an interactive picture within a field of view of the virtual UAV.

In some embodiments, the foregoing virtual UAV control method may be used in, but is not limited to, scenes in which a client is used for target interactive applications (such as virtual shooting interaction).

In some embodiments, the first display unit 1102 may be configured to perform S202, the first response unit 1104 may be configured to perform S204, and the second display unit 1106 may be configured to perform S206.

Through this embodiment, firstly, in an interactive scene of a target interactive application, an interactive picture within a field of view of a first virtual operation object is displayed in a currently running one-round interactive task. If a virtual UAV of the first virtual operation object is in an allowed-for-use state and a user triggers a first target operation, the virtual UAV is called in the target interactive application in response to the first target operation. Then, a picture within a field of view of the virtual UAV is displayed in a target interactive application. An objective of displaying an interactive picture within the field of view of the virtual UAV in the target interactive application is achieved, thereby switching, in an interactive scene, an interactive picture within the field of view of the first virtual operation object to an interactive picture within the field of view of the virtual UAV and resolving the technical problem in the related art that a field of view is single when an enemy track is searched for in virtual shooting interaction.

In some embodiments, the apparatus further includes:
(1) a third display unit, configured to display an operation interface of the virtual UAV in the target interactive application in response to the interactive picture within the field of view of the virtual UAV is displayed in the target interactive application, where the operation interface is displayed with predetermined transparency on the interactive picture within the field of view of the virtual UAV, the operation interface includes a first set of virtual buttons, and the first set of virtual buttons are used for controlling the virtual UAV to ascend and descend in a three-dimensional virtual space of the one-round interactive task.

In some embodiments, the second display unit includes:
(1) a first display module, configured to display a second set of virtual buttons on the operation interface, where the second set of virtual buttons are used for controlling the virtual UAV to move on a plane in the three-dimensional virtual space; or
(2) a second display module, configured to display a second set of virtual buttons and a third set of virtual buttons on the operation interface, where the second set of virtual buttons are used for controlling the virtual UAV to move on a plane in the three-dimensional virtual space, and the third set of virtual buttons are used for controlling the virtual UAV to perform an attack operation.

In some embodiments, the second display unit includes:
(1) a first acquisition module, configured to acquire a second target operation from the target interactive application;
(2) a first response module, configured to control, in response to the second target operation, the virtual UAV to move to a target position; and
(3) a third display module, configured to display a target interactive picture in the target interactive application, where the target interactive picture is an interactive picture within the field of view of the virtual UAV at the target position.

In some embodiments,
(1) the first acquisition module is further configured to acquire, from the target interactive application, a first touch operation performed on a first virtual button in the operation interface of the virtual UAV, where the operation interface of the virtual UAV is displayed with predetermined transparency on the interactive picture within the field of view of the virtual UAV, the first virtual button is used for controlling the virtual UAV to ascend in a three-dimensional virtual space of the one-round interactive task, and the second target operation includes the first touch operation; and
(2) the first response module being further configured to control, in response to the second target operation, the virtual UAV to move to a target position includes: controlling, in response to the first touch operation, the virtual UAV to ascend from a first position in the three-dimensional virtual space to a second position, where the target position includes the second position.

In some embodiments,
(1) the first acquisition module is further configured to acquire, from the target interactive application, a second touch operation performed on a second virtual button in the operation interface of the virtual UAV, where the operation interface of the virtual UAV is displayed with predetermined transparency on the interactive picture within the field of view of the virtual UAV, the second virtual button is used for controlling the virtual UAV to descend in a three-dimensional virtual space of the one-round interactive task, and the second target operation includes the second touch operation; and
(2) the first response module being further configured to control, in response to the second target operation, the virtual UAV to move to a target position includes: controlling, in response to the second touch operation, the virtual UAV to descend from a third position in the three-dimensional virtual space to a fourth position, where the target position includes the fourth position.

In some embodiments, the apparatus further includes:
(1) a fourth display unit, configured to, display, after the virtual UAV is controlled, in response to the second target operation, to move to the target position, prompt information in the target interactive application in response to an altitude of the target position is a preset maximum altitude, where the prompt information is used for prompting that the virtual UAV is already at the maximum altitude.

In some embodiments,
(1) the fourth display unit is further configured to display, in the target interactive application, a first virtual button as being in an untouchable state, where the first virtual button is a virtual button in the operation interface of the virtual UAV, the operation interface of the virtual UAV is displayed with predetermined transparency on the interactive picture within the field of view of the virtual UAV, and the first virtual button is used for controlling the virtual UAV to ascend in a three-dimensional virtual space of the one-round interactive task.

In some embodiments, the apparatus further includes:
(1) a first acquisition unit, configured to acquire, from the target interactive application, a third touch operation performed on a third virtual button in the operation interface of the virtual UAV in response to the interactive picture within the field of view of the virtual UAV is displayed in the target interactive application, where the operation interface of the virtual UAV is displayed with predetermined transparency on the interactive picture within the field of view of the virtual UAV, and the third virtual button is used for controlling the virtual UAV to perform an attack operation; and
(2) a second response unit, configured to control, in response to the third touch operation, the virtual UAV to perform the attack operation.

In some embodiments, the apparatus further includes:
(1) a setting unit, configured to set, before the virtual UAV is called in the target interactive application in response to the first target operation, the virtual UAV of the first virtual operation object to be in an allowed-for-use state in response to an operation result of the first virtual operation object in the one-round interactive task meets a predetermined condition.

In some embodiments, the setting unit includes:
(1) a first setting module, configured to set the virtual UAV of the first virtual operation object to be in the allowed-for-use state in response to a quantity of virtual operation objects killed by the first virtual operation object in the one-round interactive task is greater than a predetermined quantity; or
(2) a second setting module, configured to set the virtual UAV of the first virtual operation object to be in the allowed-for-use state in response to the first virtual operation object moves to a target position in the one-round interactive task; or
(3) a third setting module, configured to set the virtual UAV of the first virtual operation object to be in the allowed-for-use state in response to the first virtual operation object touches a target virtual prop in the one-round interactive task.

In some embodiments, the apparatus further includes:
(1) a second acquisition unit, configured to acquire, before an interactive picture within a field of view of a first virtual operation object in a currently running one-round interactive task is displayed in a target interactive application, a fourth touch operation from a preparation interface before the one-round interactive task starts; and
(2) a third response unit, configured to configure, for the first virtual operation object in response to the fourth touch operation, that the virtual UAV is allowed for use after the one-round interactive task starts.

In some embodiments, the apparatus further includes:
(1) a fifth display unit, configured to, after the interactive picture within the field of view of the virtual UAV is displayed in the target interactive application, deactivate the virtual UAV in the target interactive application and display, in the target interactive application, the interactive picture within the field of view of the first virtual operation object in response to a service duration of the virtual UAV reaches a predetermined duration.

According to a further aspect of the embodiments of this application, a storage medium is further provided, the storage medium storing a computer program, the computer program being configured to perform, when run, steps in any one of the method embodiments.

In some embodiments, the storage medium may be configured to store a computer program used for performing the following steps:
S1. Display, in a currently running one-round interactive task in a target interactive application, an interactive picture within a field of view of a first virtual operation object.
S2. Call, in response to a virtual UAV of the first virtual operation object is in an allowed-for-use state, the virtual UAV in the target interactive application in response to a first target operation.
S3. Display, in the target interactive application, an interactive picture within a field of view of the virtual UAV.

In some embodiments, a person of ordinary skill in the art may understand that all or some of the steps of the methods in the foregoing embodiments may be implemented by a program instructing relevant hardware of the terminal device. The program may be stored in a computer-readable storage medium. The storage medium may include a flash disk, a read-only memory (ROM), a random access memory (RAM), a magnetic disk, an optical disc, and the like.

Figure 12:
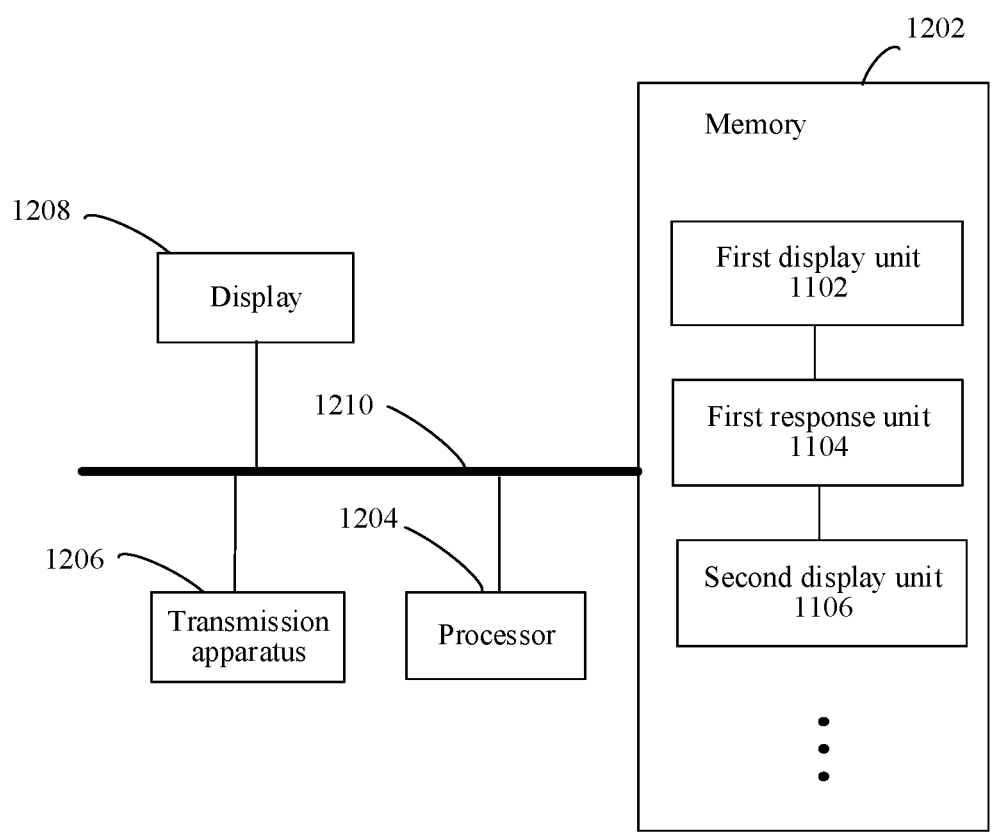
FIG. 12 is a schematic structural diagram of an electronic device according to an embodiment of this application.

According to another aspect of the embodiments of this application, an electronic device configured to implement the virtual UAV control method is further provided. As shown in FIG. 12, the electronic device includes a memory 1202 and a processor 1204. The memory 1202 stores a computer program. The processor 1204 is configured to perform steps in any one of the foregoing method embodiments through the computer program.

In some embodiments, the electronic device may be located in at least one of a plurality of network devices located in a computer network.

In some embodiments, the processor may be configured to perform the following steps through the computer program:
S1. Display, in a currently running one-round interactive task in a target interactive application, an interactive picture within a field of view of a first virtual operation object.
S2. Call, in response to a virtual UAV of the first virtual operation object is in an allowed-for-use state, the virtual UAV in the target interactive application in response to a first target operation.
S3. Display, in the target interactive application, an interactive picture within a field of view of the virtual UAV.

In some embodiments, a person of ordinary skill in the art may understand that, the structure shown in FIG. 12 is only schematic. The electronic device may be a terminal device such as a smartphone (such as an Android mobile phone or an iOS mobile phone), a tablet computer, a palmtop computer, an MID, or a PAD. FIG. 12 does not limit the structure of the foregoing electronic device. For example, the electronic device may further include more or fewer components (such as a network interface) than those shown in FIG. 12, or have configuration different from that shown in FIG. 12.

The memory 1202 may be configured to store software programs and modules, for example, program instructions/modules corresponding to the virtual UAV control method and apparatus in the embodiments of this application. The processor 1204 runs the software programs and modules stored in the memory 1202, to perform various functional applications and data processing, to be specific, implement the foregoing virtual UAV control method. The memory 1202 may include a high-speed random memory, and a non-volatile memory such as one or more magnetic storage apparatuses, a flash memory, or another non-volatile solid-state memory. In some examples, the memory 1202 may further include memories remotely disposed relative to the processor 1204, and these remote memories may be connected to a terminal through a network. Instances of the network include, but are not limited to, the Internet, an intranet, a local area network, a mobile communication network, and a combination thereof. In an example, as shown in FIG. 12, the memory 1202 may include, but is not limited to, the first display unit 1102, the first response unit 1104, and the second display unit 1106 in the virtual UAV control apparatus. In addition, the memory may further include, but is not limited to, other module units in the virtual UAV control apparatus. The other module units are not described in detail in this example.

In some embodiments, the transmission apparatus 1206 is configured to receive or send data through a network. Specific instances of the foregoing network may include a wired network and a wireless network. In an example, the transmission apparatus 1206 includes a network interface controller (NIC). The NIC may be connected to another network device and a router by using a network cable, so as to communicate with the Internet or the local area network. In an example, the transmission apparatus 1206 is a radio frequency (RF) module, and is configured to wirelessly communicate with the Internet.

In addition, the electronic device further includes: a display 1208, configured to display an interactive picture within a field of view of a virtual UAV; and a connection bus 1210, configured to connect various module components in the electronic device.

In other embodiments, the terminal or server may be a node in a distributed system. The distributed system may be a blockchain system. The blockchain system may be a distributed system formed by the plurality of nodes connected in the form of network communication. The nodes may form a peer to peer (P2P) network. Computing devices in any form, for example, electronic devices such as a server and a terminal, can join the P2P network to become a node in the blockchain system.

In some embodiments, a person of ordinary skill in the art may understand that all or some of the processes of the methods in the foregoing embodiments may be implemented by a computer program instructing relevant hardware. The program may be stored in a non-volatile computer-readable storage medium. When the program runs, the procedures of the foregoing method embodiments are performed. References to the memory, the storage, the database, or another medium used in the embodiments provided in this application may all include a non-volatile memory and a volatile memory. The non-volatile memory may include a ROM, a programmable ROM (PROM), an electrically programmable ROM (EPROM), an electrically erasable programmable ROM (EEPROM), or a flash memory. The volatile memory may include a RAM or a cache. By way of description rather than limitation, the RAM may be obtained in a plurality of forms, such as a static RAM (SRAM), a dynamic RAM (DRAM), a synchronous DRAM (SDRAM), a double data rate SDRAM (DDRSDRAM), an enhanced SDRAM (ESDRAM), a synchlink DRAM (SLDRAM), a Rambus direct RAM (RDRAM), a direct Rambus dynamic RAM (DRDRAM), and a Rambus dynamic RAM (RDRAM).

Each module/unit in various disclosed embodiments can be integrated in a processing unit, or each module/unit can exist separately and physically, or two or more modules/units can be integrated in one unit. The modules/units as disclosed herein can be implemented in the form of hardware (e.g., processing circuitry and/or memory) or in the form of software functional unit(s) (e.g., developed using one or more computer programming languages), or a combination of hardware and software.

In an embodiment, a computer program product or computer program is provided, the computer program product or computer program including computer instructions, and the computer instructions being stored in a computer-readable storage medium; and in response to a processor of an electronic device reads the computer instructions from the computer-readable storage medium and executes the computer instructions, the electronic device performs the virtual UAV control method.

The sequence numbers of the foregoing embodiments of this application are merely for description purpose but do not indicate the preference of the embodiments.

When the integrated unit in the foregoing embodiments is implemented in the form of a software function unit and sold or used as an independent product, the integrated unit may be stored in the foregoing computer-readable storage medium. Based on such an understanding, the technical solutions of this application essentially, or the part contributing to the prior art, or the entire or some of the technical solutions may be implemented in a form of a software product. The computer software product is stored in a storage medium and includes several instructions for instructing one or more computer devices (which may be a personal computer, a server, a network device, or the like) to perform all or some of the steps of the methods described in the embodiments of this application.

In the foregoing embodiments of this application, the descriptions of the embodiments have their respective focuses. For a part that is not described in detail in an embodiment, refer to related descriptions in other embodiments.

In the several embodiments provided in this application, it is to be understood that the disclosed client may be implemented in other manners. The apparatus embodiments described above are merely exemplary. For example, the division of the units is merely the division of logic functions, and may use other division manners in actual implementation. For example, a plurality of units or components may be combined, or may be integrated into another system, or some features may be omitted or not performed. In addition, the coupling, or direct coupling, or communication connection between the displayed or discussed components may be the indirect coupling or communication connection by using some interfaces, units, or modules, and may be electrical or of other forms.

The units described as separate parts can or cannot be physically separate. Parts displayed as units can or cannot be physical units, and can be located in one position, or can be distributed on a plurality of network units. Some or all of the units may be selected according to actual requirements to achieve the objectives of the solutions of the embodiments.

In addition, functional units in the embodiments of this application can be integrated into one processing unit, or each of the units can exist alone physically, or two or more units are integrated into one unit. The integrated unit may be implemented in the form of hardware, or may be implemented in the form of a software function unit.

The foregoing descriptions are merely exemplary implementations of this application. A person of ordinary skill in the art may make some improvements and polishing without departing from the principle of this application and the improvements and polishing shall fall within the protection scope of this application.

What is claimed is:

1. A virtual unmanned aerial vehicle (UAV) control method, performed by an electronic device, the method comprising:
    displaying, in a currently running one-round interactive task in a target interactive application, a first interactive picture within a field of view of a first virtual player character holding a weapon at an original position in a three-dimensional virtual space of the one-round interactive task, the target interactive application being a virtual shooting game application, the first virtual player character being controlled based on a user control operation to carry out an action related to virtual shooting by person;
    setting the virtual UAV of the first virtual player character to be in a target state to indicate that the virtual UAV is allowed for use in response to a quantity of virtual operation objects killed by the first virtual player character in the one-round interactive task being greater than a predetermined quantity;

in response to a virtual UAV of the first virtual player character being in the target state:
  calling the virtual UAV in the target interactive application in response to a first target operation; and
  executing a reconnaissance mode by moving the virtual UAV while keeping the first virtual player character at the original position, comprising: switching, in the target interactive application, from displaying the first interactive picture within the field of view of the first virtual player character to displaying a second interactive picture within a field of view of the virtual UAV;
in response to an exit condition is met, exiting the reconnaissance mode by: stop using the virtual UAV and switching the first virtual player character back to an original weapon holding state at the original position; and carrying out a virtual shooting action by using the weapon held by the first virtual player character, wherein the weapon is not attached to the virtual UAV.

2. The method according to claim 1, further comprising:
displaying an operation interface of the virtual UAV in the target interactive application in response to the second interactive picture within the field of view of the virtual UAV being displayed in the target interactive application, wherein the operation interface is displayed with predetermined transparency on the second interactive picture within the field of view of the virtual UAV, the operation interface comprises a first set of virtual buttons, and the first set of virtual buttons control the virtual UAV to ascend and descend in a three-dimensional virtual space of the one-round interactive task.

3. The method according to claim 2, wherein the displaying an operation interface of the virtual UAV in the target interactive application comprises:
displaying a second set of virtual buttons on the operation interface, wherein the second set of virtual buttons control the virtual UAV to move on a plane in the three-dimensional virtual space; or
displaying a second set of virtual buttons and a third set of virtual buttons on the operation interface, wherein the second set of virtual buttons control the virtual UAV to move on a plane in the three-dimensional virtual space, and the third set of virtual buttons control the virtual UAV to perform an attack operation.

4. The method according to claim 3, wherein in response to the second interactive picture within the field of view of the virtual UAV is displayed in the target interactive application, the method further comprises:
acquiring, from the target interactive application, a third touch operation performed on a third virtual button in the operation interface of the virtual UAV, wherein the operation interface of the virtual UAV is displayed with predetermined transparency on the second interactive picture within the field of view of the virtual UAV, and the third virtual button controls the virtual UAV to perform an attack operation; and
controlling the virtual UAV to perform the attack operation in response to the third touch operation.

5. The method according to claim 1, wherein the displaying, in the target interactive application, the second interactive picture within the field of view of the virtual UAV comprises:
acquiring a second target operation from the target interactive application;
controlling, in response to the second target operation, the virtual UAV to move to a first target position; and
displaying a target interactive picture in the target interactive application, wherein the target interactive picture is the second interactive picture within the field of view of the virtual UAV at the first target position.

6. The method according to claim 5, wherein the acquiring a second target operation from the target interactive application comprises:
acquiring, from the target interactive application, a first touch operation performed on a first virtual button in the operation interface of the virtual UAV, wherein the operation interface of the virtual UAV is displayed with predetermined transparency on the second interactive picture within the field of view of the virtual UAV, the first virtual button controls the virtual UAV to ascend in a three-dimensional virtual space of the one-round interactive task, and the second target operation comprises the first touch operation; and
the controlling, in response to the second target operation, the virtual UAV to move to a first target position comprises:
controlling, in response to the first touch operation, the virtual UAV to ascend from a first position in the three-dimensional virtual space to a second position, the first target position including the second position.

7. The method according to claim 5, wherein the acquiring a second target operation from the target interactive application comprises:
acquiring, from the target interactive application, a second touch operation performed on a second virtual button in the operation interface of the virtual UAV, wherein the operation interface of the virtual UAV is displayed with predetermined transparency on the second interactive picture within the field of view of the virtual UAV, the second virtual button controls the virtual UAV to descend in a three-dimensional virtual space of the one-round interactive task, and the second target operation comprises the second touch operation; and
the controlling, in response to the second target operation, the virtual UAV to move to a first target position comprises:
controlling, in response to the second touch operation, the virtual UAV to descend from a third position in the three-dimensional virtual space to a fourth position, the first target position including the fourth position.

8. The method according to claim 5, wherein after the controlling, in response to the second target operation, the virtual UAV to move to a first target position, the method further comprises:
displaying prompt information in the target interactive application in response to an altitude of the first target position being at a preset maximum altitude, the prompt information prompting that the virtual UAV is at the maximum altitude.

9. The method according to claim 8, wherein the displaying prompt information in the target interactive application comprises:
displaying, in the target interactive application, a first virtual button as being in an untouchable state, wherein the first virtual button is a virtual button in the operation interface of the virtual UAV, the operation interface of the virtual UAV is displayed with predetermined transparency on the second interactive picture within the field of view of the virtual UAV, and the first virtual button controls the virtual UAV to ascend in a three-dimensional virtual space of the one-round interactive task.

10. The method according to claim 1, further comprising setting the virtual UAV of the first virtual player character to be in the target state in response to the first virtual player character moving to a second target position in the one-round interactive task; or setting the virtual UAV of the first virtual player character to be in the target state in response to the first virtual player character touching a target virtual prop in the one-round interactive task.

11. The method according to claim 1, wherein before the displaying, in the currently running one-round interactive task in the target interactive application, the first interactive picture within the field of view of the first virtual player character, the method further comprises:

acquiring a fourth touch operation from a preparation interface before the one-round interactive task starts; and acquiring configuration parameters of the virtual UAV in response to the fourth touch operation, wherein the configuration parameters indicating that the first virtual player character calling the virtual UAV after the one-round interactive task starts.

12. The method according to claim 1, wherein after the displaying, in the target interactive application, the second interactive picture within the field of view of the virtual UAV, the method further comprises:

deactivating the virtual UAV in the target interactive application, and displaying, in the target interactive application, the first interactive picture within the field of view of the first virtual player character in response to a service duration of the virtual UAV reaching a predetermined duration.

13. The method according to claim 1, wherein the field of view of the virtual UAV is generated from a higher altitude in the three-dimensional virtual space than the field of view of the first virtual player character.

14. The method according to claim 1, further comprising:

displaying, in the first interactive picture within the field of view of the first virtual player character, an icon indicating a state of availability of the virtual UAV;

in response to the operation result of the first virtual player character in the one-round interactive task not meeting the predetermined condition, setting the virtual UAV of the first virtual player character to be in an unavailable state and setting the icon corresponding to the virtual UAV to be inoperable; and in response to the operation result of the first virtual player character in the one-round interactive task meeting the predetermined condition, highlighting the icon corresponding to the virtual UAV and setting the icon to be operable.

15. The method according to claim 1, wherein exiting the reconnaissance mode further comprises:

switching, in the target interactive application, from displaying the first interactive picture within the field of view of the virtual UAV back to displaying the second interactive picture within the field of view of the first virtual player character.

16. The method according to claim 15, wherein the exit condition includes a service duration of the virtual UAV, and the method further comprises:

determining that the exit condition is met when a time elapsed in displaying the second interactive picture within the field of view of the virtual UAV reaches the service duration.

17. A virtual unmanned aerial vehicle (UAV) control apparatus, comprising:

at least one memory, configured to store an executable instruction; and at least one processor, configured to execute the executable instruction to:

display, in a currently running one-round interactive task in a target interactive application, a first interactive picture within a field of view of a first virtual player character holding a weapon at an original position in a three-dimensional virtual space of the one-round interactive task, the target interactive application being a virtual shooting game application, the first virtual player character being controlled based on a user control operation to carry out an action related to virtual shooting by person;

setting the virtual UAV of the first virtual player character to be in a target state to indicate that the virtual UAV is allowed for use in response to a quantity of virtual operation objects killed by the first virtual player character in the one-round interactive task being greater than a predetermined quantity;

in response to a virtual UAV of the first virtual player character being in the target state:

call the virtual UAV in the target interactive application in response to a first target operation; and execute a reconnaissance mode by moving the virtual UAV while keeping the first virtual player character at the original position, comprising: switching, in the target interactive application, from displaying the first interactive picture within the field of view of the first virtual player character to displaying a second interactive picture within a field of view of the virtual UAV;

in response to an exit condition is met, exiting the reconnaissance mode by: stop using the virtual UAV and switching the first virtual player character back to an original weapon holding state at the original position; and carrying out a virtual shooting action by using the weapon held by the first virtual player character, wherein the weapon is not attached to the virtual UAV.

18. A non-transitory computer-readable storage medium, comprising a computer program stored therein, the computer program, when executed by one or more processors, implementing:

displaying, in a currently running one-round interactive task in a target interactive application, a first interactive picture within a field of view of a first virtual player character holding a weapon at an original position in a three-dimensional virtual space of the one-round interactive task, the target interactive application being a virtual shooting game application, the first virtual player character being controlled based on a user control operation to carry out an action related to virtual shooting by person;

setting the virtual UAV of the first virtual player character to be in a target state to indicate that the virtual UAV is allowed for use in response to a quantity of virtual operation objects killed by the first virtual player character in the one-round interactive task being greater than a predetermined quantity;

in response to a virtual UAV of the first virtual player character being in the target state:

calling the virtual UAV in the target interactive application in response to a first target operation; and executing a reconnaissance mode by moving the virtual UAV while keeping the first virtual player character at the original position, comprising: switching, in the target interactive application, from displaying the first interactive picture within the field of view of the first virtual player character to displaying a second interactive picture within a field of view of the virtual UAV;

in response to an exit condition is met, exiting the reconnaissance mode by: stop using the virtual UAV and switching the first virtual player character back to an original weapon holding state at the original position; and carrying out a virtual shooting action by using the weapon held by the first virtual player character, wherein the weapon is not attached to the virtual UAV.

\* \* \* \* \*